(12) United States Patent
Jeppe et al.

(10) Patent No.: US 8,570,692 B2
(45) Date of Patent: Oct. 29, 2013

(54) OVERVOLTAGE PROTECTION FOR INVERTERS THAT COMPRISE AN EMC FILTER AT THEIR INPUT END

(75) Inventors: Andreas Jeppe, Kaufungen (DE); Henrik Wolf, Kassel (DE); Torben Westphal, Kassel (DE); Sven Bremicker, Alheim (DE); Frank Greizer, Kaufungen (DE); Adrian Haering, Niestetal (DE)

(73) Assignee: SMA Solar Technology AG, Niestetal (DE)

( * ) Notice: Subject to any disclaimer, the term of this patent is extended or adjusted under 35 U.S.C. 154(b) by 30 days.

(21) Appl. No.: 13/305,101

(22) Filed: Nov. 28, 2011

(65) Prior Publication Data
US 2012/0140363 A1 Jun. 7, 2012

Related U.S. Application Data

(63) Continuation of application No. PCT/EP2010/054922, filed on Apr. 15, 2010.

(30) Foreign Application Priority Data

May 26, 2009 (EP) .................................... 09161166

(51) Int. Cl.
H02H 7/00 (2006.01)
(52) U.S. Cl.
USPC ........................................................ 361/18
(58) Field of Classification Search
USPC ........................................................ 361/18
See application file for complete search history.

(56) References Cited

U.S. PATENT DOCUMENTS

| | | | | |
|---|---|---|---|---|
| 5,790,360 A * | 8/1998 | Ryan | ............................. | 361/111 |
| 5,825,598 A * | 10/1998 | Dickens et al. | ................. | 361/42 |
| 6,034,611 A * | 3/2000 | Brooks et al. | ................. | 340/647 |
| 6,486,570 B1 * | 11/2002 | Price et al. | .................... | 307/105 |
| 7,417,841 B2 * | 8/2008 | Hotchkiss et al. | ............ | 361/103 |
| 7,629,708 B1 * | 12/2009 | Meyers et al. | .................. | 307/66 |
| 7,944,156 B2 * | 5/2011 | Quazi | ........................... | 315/307 |
| 8,174,853 B2 * | 5/2012 | Kane et al. | ...................... | 363/40 |
| 8,378,778 B2 * | 2/2013 | Duval et al. | ..................... | 338/20 |
| 2007/0097584 A1 * | 5/2007 | Ducharme et al. | ........... | 361/118 |
| 2008/0094867 A1 | 4/2008 | Muller et al. | | |

(Continued)

FOREIGN PATENT DOCUMENTS

| | | | |
|---|---|---|---|
| DE | 3442932 | A1 | 6/1986 |
| DE | 102007007921 | A1 | 8/2008 |
| EP | 0678961 | A1 | 10/1995 |
| JP | 2001186664 | A | 7/2001 |

OTHER PUBLICATIONS

International Search Report dated Dec. 29, 2011 for International Application No. PCT/EP2010/054922. 7 Pages

*Primary Examiner* — Ronald W Leja
(74) *Attorney, Agent, or Firm* — Eschweller & Associates, LLC (57) ABSTRACT

In an overvoltage protection apparatus before an inverter configured to feed electric energy from a DC voltage source into an AC power grid, the overvoltage protection apparatus includes a DC voltage input stage. The DC voltage input stage includes at least two current-carrying lines and an EMC filter including interference suppressing capacitors and interference suppressing inductors, and surge arrestors configured to divert overvoltages with respect to ground are connected to the current-carrying lines after the EMC filter, from a point of view of the DC voltage source.

20 Claims, 5 Drawing Sheets

(56) References Cited

U.S. PATENT DOCUMENTS

| | | |
|---|---|---|
| 2008/0111517 A1* | 5/2008 | Pfeifer et al. ............... 320/101 |
| 2008/0130180 A1* | 6/2008 | de Palma et al. ............ 361/56 |
| 2008/0291706 A1* | 11/2008 | Seymour et al. ............ 363/40 |
| 2011/0197946 A1* | 8/2011 | Falk et al. ................... 136/244 |
| 2012/0140363 A1* | 6/2012 | Jeppe et al. ................. 361/18 |
| 2013/0070491 A1* | 3/2013 | Jiang-Hafner et al. ...... 363/41 |

* cited by examiner

OVERVOLTAGE PROTECTION FOR INVERTERS THAT COMPRISE AN EMC FILTER AT THEIR INPUT END

REFERENCE TO RELATED APPLICATIONS

This application is a continuation application of PCT application number PCT/EP2010/054922 filed on Apr. 15, 2010, that claims priority to European Application No. 09 161 166.5, filed on May 26, 2009, the contents of which are hereby incorporated by reference in their entirety.

FIELD

The present invention relates to an overvoltage protection apparatus for an inverter for feeding electric energy from a DC voltage source particularly into an AC power grid. Further, a surge arrestor is provided that is particularly well suited for such an overvoltage protection apparatus. Additionally, an exemplary use of the new overvoltage protection apparatus and the new surge arrestor, respectively, is addressed.

BACKGROUND

Especially with inverters for feeding electric energy from photovoltaic devices, however, due to the huge total surface of the solar modules and due to the length of their cabling up to the respective inverter, there is an increased danger of transient overvoltages being coupled into the cabling of the strings by lightning strikes in the closer surroundings, i.e., by so-called nearby strikes, and being transferred onto the inverter. These transient overvoltages pose a danger to all electronic and electric parts of the inverter.

In order to protect inverters that feed electric energy from photovoltaic devices into AC power grids against transient overvoltages, it is common practice to connect surge arrestors to all lines running towards the inverter in such a way that the surge arrestors are effective both between the lines and between each individual line and ground. By means of these surge arrestors, the inverter is protected to a maximum extent, if they are provided directly before its DC input stage.

In an overvoltage protection apparatus comprising the features of the prior art, a DC input stage of the inverter includes an EMC Filter that includes interference suppressing capacitors and interference suppressing inductances. In combination with further measures, this EMC filter serves for electromagnetic compliance when feeding electric energy via the inverter into the AC power grid.

Surge arrestors of the company DEHN+SÖHNE GmbH+ Co. KG, Nuremberg, Germany are known by their product name DEHNguard®, in which two alternative current paths are provided. A varistor is provided in the one current path, a lead fuse in the other. A selector switch selecting between these two paths is at first switched to the one path with the varistor but is biased by a spring in the direction to the other path with the lead fuse. In this switching position it is held as long as a fusible component that is in thermal contact with the varistor is not yet fused. When the varistor is strongly loaded, such that its increase in temperature results in fusing of the fusible component, the selector switch is released and switches the ground current to the lead fuse. With a further continuing ground current, the lead fuse fuses. An electric arc that may occur here is extinguished by the lead fuse itself, which is designed accordingly and which is resistant against the influences of the electric arc. The selector switch does not only switch the ground current to the lead fuse but also moves a signalling pin leading outward out of the surge arrestor, by which it may be noticed optically or via a micro switch that the overvoltage protection has been stressed irreversibly and that at least a replacement of the fusible component and an inspection of the lead fuse are necessary. These known surge arrestors are complicated in their construction; they require special a self-extinguishing lead fuse; and they are accordingly expensive.

Usually, a DC voltage input stage of an inverter comprises a buffer capacitance of a considerable size in order to compensate for the pulsed current intake by the inverter and to smooth the backward influences from this, respectively.

SUMMARY

It is a solution of the invention to provide an overvoltage protection for an inverter configured to feed electric energy from a DC voltage source into an AC power grid that protects all electronic and electric parts of the inverter effectively and cost-efficiently against transient overvoltages as well as against impacts thereof.

The problem of transient voltages is solved by an overvoltage protection apparatus. In one embodiment the invention relates to a surge arrestor that may be used advantageously in the new overvoltage protection apparatus. Another embodiment relates to an inverter configured to feed electric energy into an AC power grid from a photovoltaic device that comprises several strings, the inverter comprising a new overvoltage protection apparatus and/or a new surge arrestor.

In the new overvoltage protection apparatus, the surge arrestors for diverting overvoltages with respect to ground are connected, from a point of view of the DC voltage source, to the current carrying lines of the inverter after the EMC filter. Thus, the surge arrestors are able to divert also overvoltages that are due to excitations of the EMC filter that result from transient overvoltages and to protect the inverter also against these overvoltages.

It proves to be sufficient here to connect the surge arrestors after the EMC filter only between the lines and electric ground. That means, surge arrestors that are active for overvoltages between the individual lines can be omitted. This is an implication of the buffer capacitance that is connected between the lines in the DC voltage input stage after the surge arrestors, as seen from the DC voltage source. For such overvoltages between the lines that do not yet trigger a diversion towards ground, the size of this buffer capacitance is usually sufficient to buffer these overvoltages between the lines to a non-hazardous level.

Particularly this applies if, in the new overvoltage protection apparatus, further surge arrestors are connected before the EMC filter, as seen from the DC voltage source, to the lines or to feed lines of parts of the DC voltage source to these lines. The feed lines may, for example, be the wiring of individual strings of a photovoltaic device. The further surge arrestors thus also protect the EMC filter and help limit the excitation of oscillations in the EMC filter, even if it is not possible by the help of these further surge arrestors to avoid any overvoltages after the EMC filter that is due to transient overvoltages coupled into the feed lines.

The further surge arrestors may be provided anywhere between the respective DC voltage source or its parts, respectively, and the EMC filter of the DC voltage input stage. However, in one embodiment these further surge arrestors are connected to the lines or to the feed lines directly before the EMC filter. That means, in one embodiment these further surge arrestors may be provided at the location of the inverter spatially remote from the DC voltage source or its parts, particularly directly in a housing of the inverter. First, this results in all transient overvoltages coupled into the feed lines being diverted by the further surge arrestors before they get to the EMC filter. Second, the surge arrestors may be monitored centrally at the location of the inverter. Further surge arrestors may of course be connected to the feed lines close to individual solar modules for their protection.

With regard to the further surge arrestors, in one embodiment they are not only effective with regard to electric ground but also between the lines or the feed lines.

In practice, plug-in positions for the further surge arrestors may in particular be provided directly within the housing of the inverter, the occupation of which is monitored by switches of a monitoring device. These same switches are, in one embodiment, switched when the respective surge arrestor has been loaded to such an extent that it has suffered from changes that are irreversible without external intervention. Actually, the further surge arrestors may each comprise two parallel diversion paths, wherein a varistor is arranged in the one diversion path and a self-extinguishing lead fuse is connected in the other diversion path, and wherein a selector switch switches from the one diversion path to the other diversion path and the associated switch at the plug-in position of the further surge arrestor is switched over when the varistor has been exposed to a predefined thermal load.

Such surge arrestors may in principle also be used as surge arrestors according to the invention that are arranged downstream of the EMC filter, from the point of view of the DC voltage source. The additional costs occurring by this measure are on the one hand reduced by the small amount of surge arrestors required, since only overvoltages with respect to ground have to be diverted. The additional cost effort, however, is still considerable then.

Thus, according to one embodiment of the invention, a surge arrestor particularly for a use at this point is proposed, in which a series connection of a varistor and a lead fuse that is thermally coupled to the varistor is provided, wherein a monitoring device monitors the voltage across the lead fuse. Due to the thermal coupling, the lead fuse interrupts the ground current through the varistor when the varistor tends to overheat. An electric arc may occur here between the parts of the lead fuse that get separated by the fusing. This electric arc may be recognized by the monitoring device in a simple way, since it is associated with a characteristic voltage across the lead fuse. As long as the lead fuse is not fused, the voltage across the lead fuse is zero. When the lead fuse is fused and interrupts the ground current, wherein no electric arc is present (anymore), the voltage across the lead fuse corresponds to the voltage with respect to ground of the line it is connected to. Only if an electric arc is present the voltage deviates from these values, being some tens of Volts corresponding to the inner resistance of the electric arc.

In this way, in the new surge arrestor it is possible to use lead fuses that are not self-extinguishing and accordingly much more cost-effective than special self-extinguishing lead fuses. The monitoring device may namely extinguish an electric arc in the lead fuse, which is recognized by the characteristic voltage drop, by actuating a switch. This may be the actuation of a special extinguishing switch that interrupts the arc supporting external voltage across the lead fuse for a short time. As far as the new surge arrestor is, however, used in a new overvoltage protection device, it is desired that for electric arc extinguishing the monitoring device activates switches of the inverter, which are there anyway, in such a way that the external voltage supporting the electric arc breaks down at least temporarily.

The monitoring device may in any case determine the condition of the lead fuse and output this condition externally in order to indicate the necessity of replacing the lead fuse.

In one embodiment all surge arrestors used in the new overvoltage protection apparatus, even if they have altered their state irreversibly due to a high ground current without external intervention, do not result in the inverter losing its basic functionality. Rather, after extinguishing any electric arcs, it may be further operated to feed electric energy from the DC voltage source, even if its overvoltage protection is then available only to a limited extent or is possibly no longer available at all. However, the danger of occurrence of several transient overvoltages one after the other may be neglected from a statistical point of view.

In one embodiment, in the new surge arrestor and the new overvoltage protection apparatus, respectively, the monitoring device comprises an independent energy supply that is both protected against the transient overvoltages to be diverted and not dependent on the input voltage of the inverter or a grid voltage of an AC power grid, since the overvoltage protection has, for example, also to be ensured during the night and in case of grid breakdown. At least, the monitoring device should be self-supplied for longer periods of time, wherefore the supply out of an appropriately dimensioned accumulator, capacitor or other energy buffer is sufficient in one embodiment.

The use of the new overvoltage protection apparatus and/or the new surge arrestors in an inverter configured to, feed electric energy from a photovoltaic device including several strings into an AC power grid yields particularly huge advantages, since the danger of transient overvoltages coupled in by nearby strikes is substantially reduced.

Advantageous developments of the invention result from the claims, the description and the drawings. The advantages of features and of combinations of a plurality of features mentioned at the beginning of the description only serve as examples and may be used alternatively or cumulatively without the necessity of embodiments according to the invention having to obtain these advantages. Further features may be taken from the drawings, in particular from the illustrated geometries and the relative dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features that are illustrated in separate drawings, or that are mentioned when describing them. These features may also be combined with features of different claims. Furthermore, it is possible that features mentioned in the claims can be omitted for further embodiments of the invention.

BRIEF DESCRIPTION OF THE DRAWINGS

In the following, the invention is further explained and described by means of examples of embodiments with reference to the enclosed drawings.

DETAILED DESCRIPTION

Primarily, the present invention is related to inverters by which electric energy from a photovoltaic device serving as a DC voltage source is fed into an AC power grid. It is common in photovoltaic devices to arrange individual solar modules in groups, so-called strings, which are connected then to the inverter via a common cabling. The present invention, however, is not restricted to photovoltaic devices as DC voltage sources.

Particularly, the invention is provided for inverters for feeding electric energy into an AC power grid. In principle, however, the inverter may also serve for feeding electric energy from the respective DC voltage source directly into a load, like for example an electric machine.

The inventors noticed that occurring transient overvoltages are not completely diverted by surge arrestors upstream of the DC voltage input stage of an inverter to such an extent that the voltage level at the input of the DC voltage input stage of the inverter does not change anymore in a transient way. Due to the transient changes of the voltage level, oscillations of the resonant circuits formed by the interference suppressing capacitors and interference suppressing inductances in the EMC filter may be excited. These oscillations may have a distinctly higher amplitude than their excitation, such that, in spite of the achieved reduction of a transient overvoltage by means of the surge arrestors upstream of the DC voltage input stage of the inverter, a transient overvoltage that is increased again up to a dangerous level may result after the EMC filter.

Figure 1:
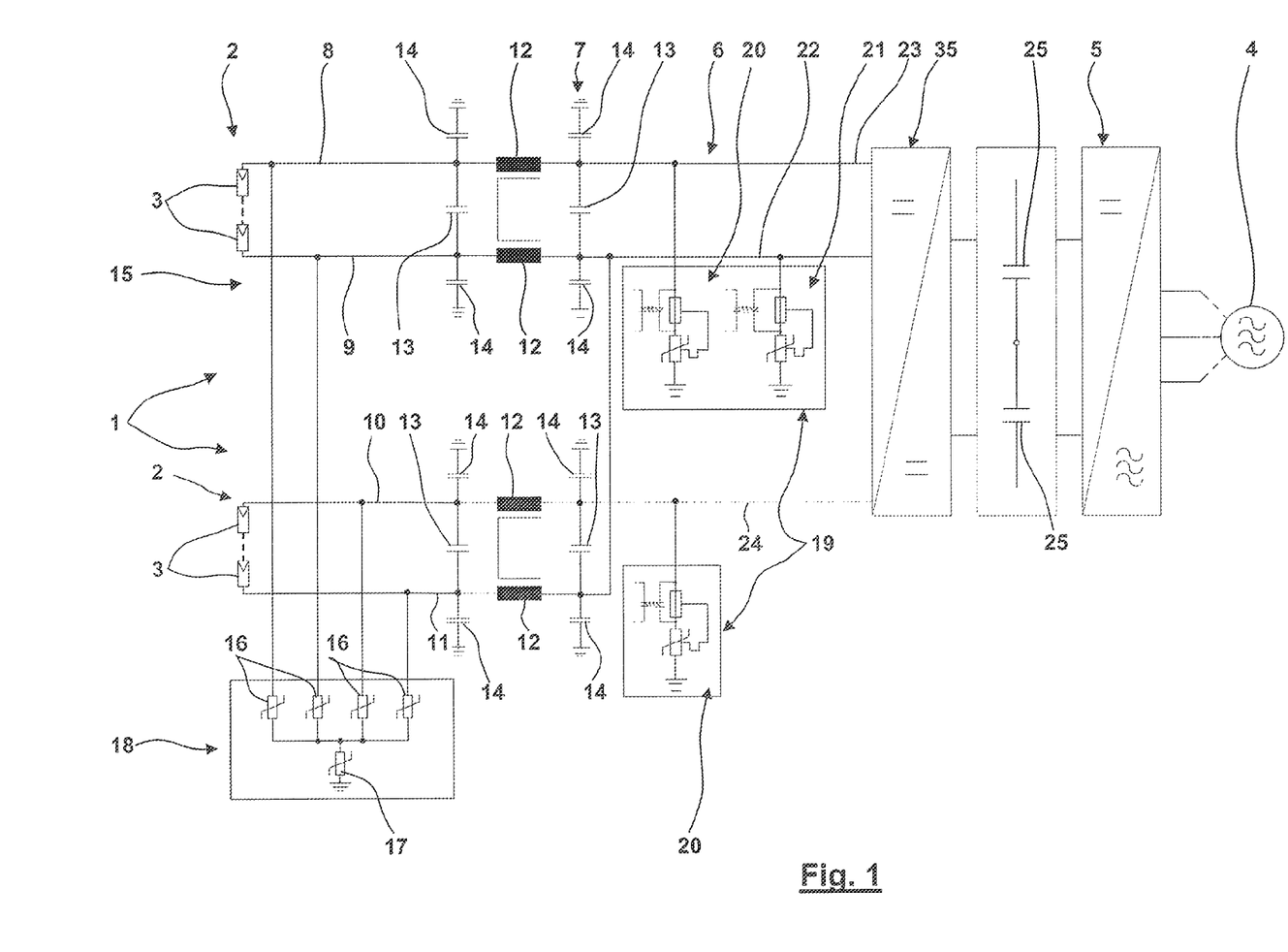
FIG. 1 is a schematic diagram illustrating the overvoltage protection apparatus according to one embodiment of the invention.

FIG. 1 illustrates a circuit configuration configured to feed electric energy from a photovoltaic device 1, comprising two strings 2 here, each comprising several solar modules 3, into an AC power grid 4. Feeding occurs via an inverter 5 that has a DC input stage 6. An EMC filter 7 that includes interference suppressing inductances 12 in each of the lines 8 to 11 coming from the strings 2, forms part of the DC input stage 6. Further, the EMC filter 7 includes interference suppressing capacitors 13 and 14 that are provided between the two lines 8 and 9, and 10 and 11, respectively, of each string 2, and between the lines 8 to 11 and ground, respectively. Surge arrestors 16 and 17 that divert transient overvoltages on each of the lines 8 to 11 with respect to any of the other lines or with respect to ground, are provided upstream of the EMC filter, from the point of view of the solar modules 3, i.e., from the point of view of the photovoltaic device serving as a DC voltage source 15. These surge arrestors 16 and 17 form a primary overvoltage protection 18 that is placed at a central location, for example, within a common housing, like all following parts up to and including the inverter 5. After the EMC filter 7, from the point of view of the DC voltage source 15, a secondary overvoltage protection 19 is provided that protects the following parts of the inverter 5 against transient overvoltages that get behind the EMC filter despite the primary overvoltage protection 18 or that are even amplified again by the EMC filter being excited by oscillations. The secondary overvoltage protection 19 comprises surge arrestors 20 and 21 connected between the continuous lines 8 and 10 on the one hand and ground on the other hand or connected between a combined current carrying line 22 of both strings 2 on the one hand and ground on the other hand. Downstream of the EMC filter 7, the continuous lines 8 and 10 are still designated as current carrying lines 23 and 24 here, since they supply a DC/DC converter 35 of the DC input stage 6 with current. Further, buffer capacitances 25 are provided in the DC input stage 6. Due to the fact that the buffer capacitances 25, as usual, are dimensioned to be high, it is sufficient that the surge arrestors 20 and 21 of the secondary overvoltage protection 19 are provided only with respect to ground and not between the lines 22 to 24. Additionally, in contrast to the surge arrestors 16 and 17 of the primary overvoltage protection 18, which may be, for example, the product DEHNguard® of the company DEHN+ SÖHNE GmbH+Co. KG, Nuremberg, Germany, the surge arrestors 20 and 21 may be of a comparatively simple construction.

Figure 2:
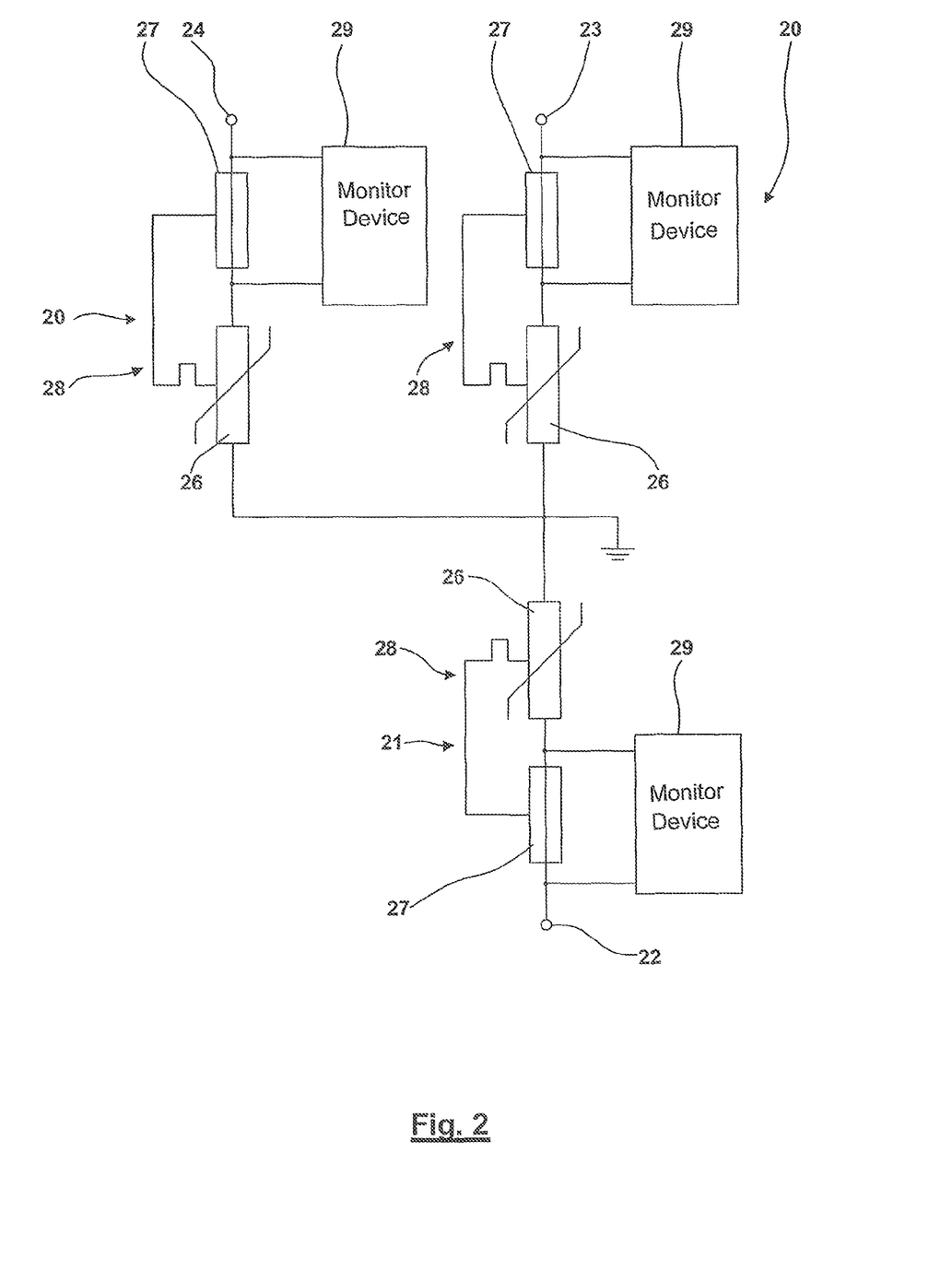
FIG. 2 shows the secondary overvoltage protection of the overvoltage protection apparatus according to FIG. 1 according to one embodiment of the invention.

A possible design of the overvoltage protection 19 according to one embodiment is illustrated in FIG. 2. The surge arrestors 20 are each provided between the positive pole of two strings and ground, whereas the surge arrestor 21 is provided between the negative pole of both strings and ground. Each surge arrestor 20 and 21 comprises the series connection of a varistor 26 and a lead fuse 27, wherein a thermal coupling 28 is provided that subjects the respective lead fuse 27 to any temperature increase of the associated varistor 26. By this functionality the lead fuse 27 fuses when the associated varistor 26 tends to be damaged or has already been damaged by diverting a high ground current due to a high transient overvoltage. The present status of the respective surge arrestor 20 and 21 is monitored, by a monitoring device 29 that monitors the voltage across each lead fuse 27. If the respective lead fuse 27 is not yet fused, no voltage drops across it. If it is fused, the voltage with respect to ground at the associated line drops across it. If, however, an electric arc burns between the poles separated by fusing of the lead fuse, the respective monitoring device 29 determines a characteristic voltage in the order of some tens of volts, which significantly differs from the two previously mentioned voltages of zero on the one hand and the full voltage at the respective line with respect to ground on the other hand. If the monitoring device 29 determines an electric arc in the associated lead fuse 27, it extinguishes this electric arc.

Figure 3:
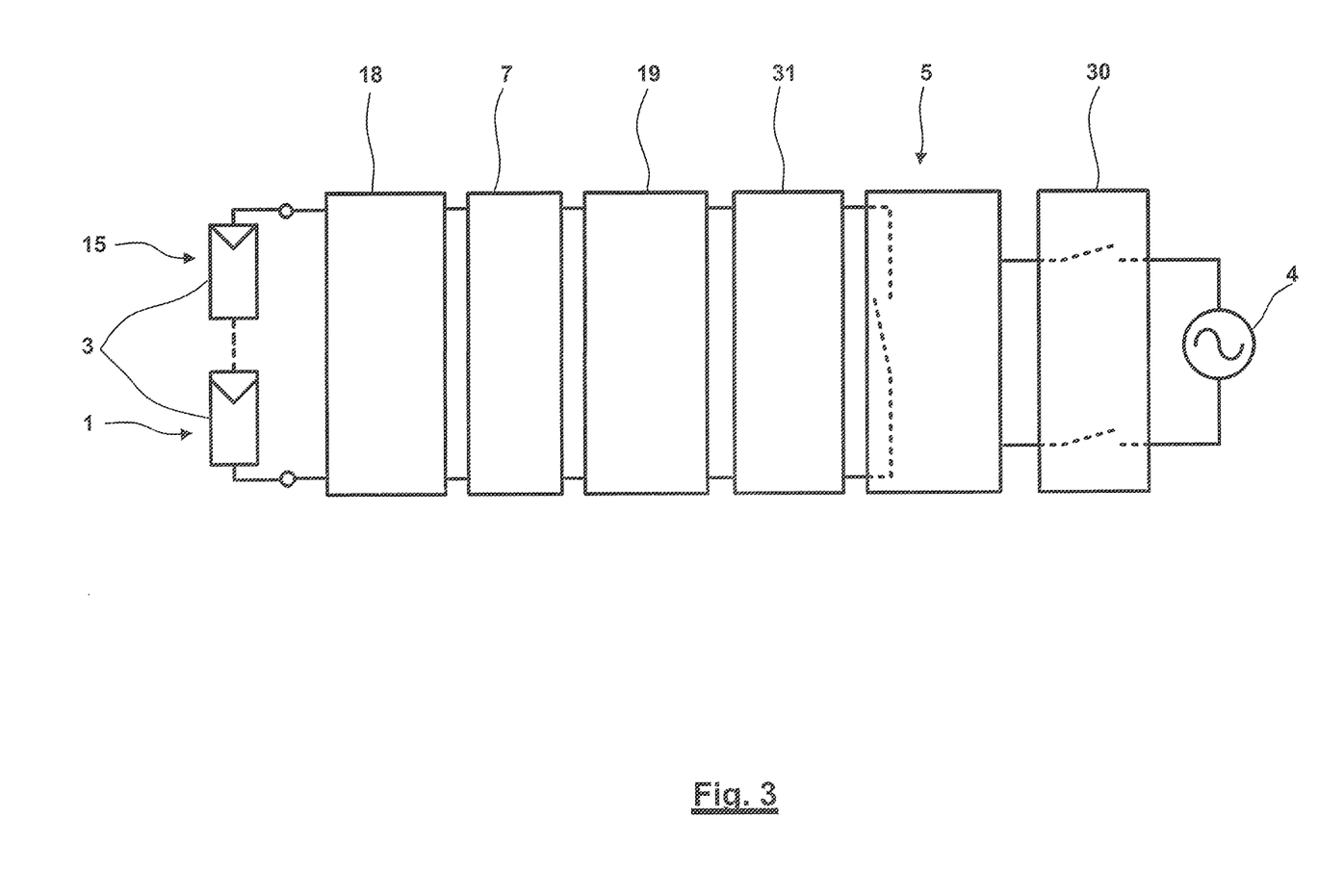
FIG. 3 is a block diagram illustrating the electric arc extinction in one of the surge arrestors according to FIG. 2.

The block diagram according to FIG. 3 shows that a grid relay 30 is usually provided between the inverter 5 and the power grid 4. By opening the grid relay 30 and shorting the DC voltage source 1 via the inverter 5, the voltage feeding the electric arc drops to such an extent that the arc is extinguished, even if the respective lead fuse 27 according to FIG. 2 is not a self-extinguishing lead fuse and is not suited for being continuously loaded by an electric arc also. FIG. 3 further shows an overcurrent fuse 31 that is provided additionally in one embodiment to protect the DC source 1.

Figure 4:
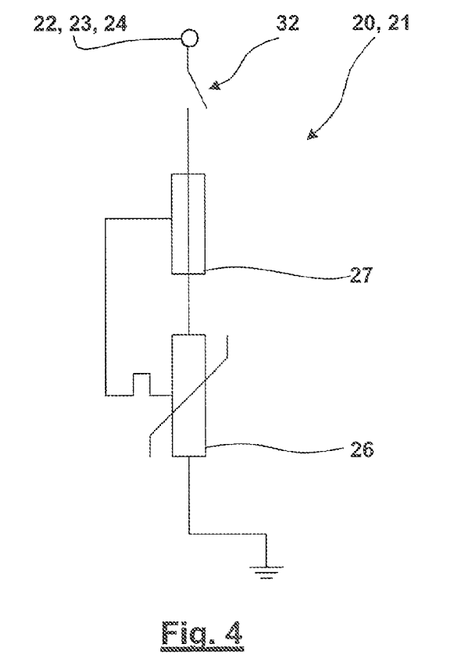
FIG. 4 is a schematic diagram illustrating a first embodiment of the electric arc extinction in one of the surge arrestors according to FIG. 2.

FIG. 4 illustrates a surge arrestor 20 or 21 in which an additional switch 32 is provided, by the opening of which an electric arc over the fuse 27 may be extinguished. Like in the following figures, the monitoring device 29 that measures the voltage across the lead fuse 27, is not depicted in FIG. 4 for reasons of clarity.

Figure 5:
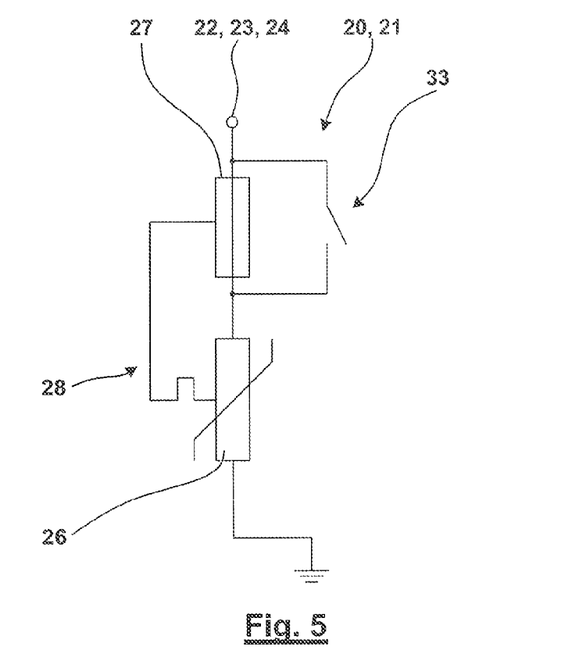
FIG. 5 is a schematic diagram illustrating a second embodiment of the electric arc extinction in one of the surge arrestors according to FIG. 2.

In another embodiment of the surge arrestor 20, 21, FIG. 5 is provided, wherein no switch 32 is connected in series with the lead fuse 27, but rather a switch 33 is provided in parallel to the lead fuse 27. In order to extinguish the electric arc, the voltage across the lead fuse, which supports the electric arc, can be shorted by closing the switch 33 for a short time.

Figure 6:
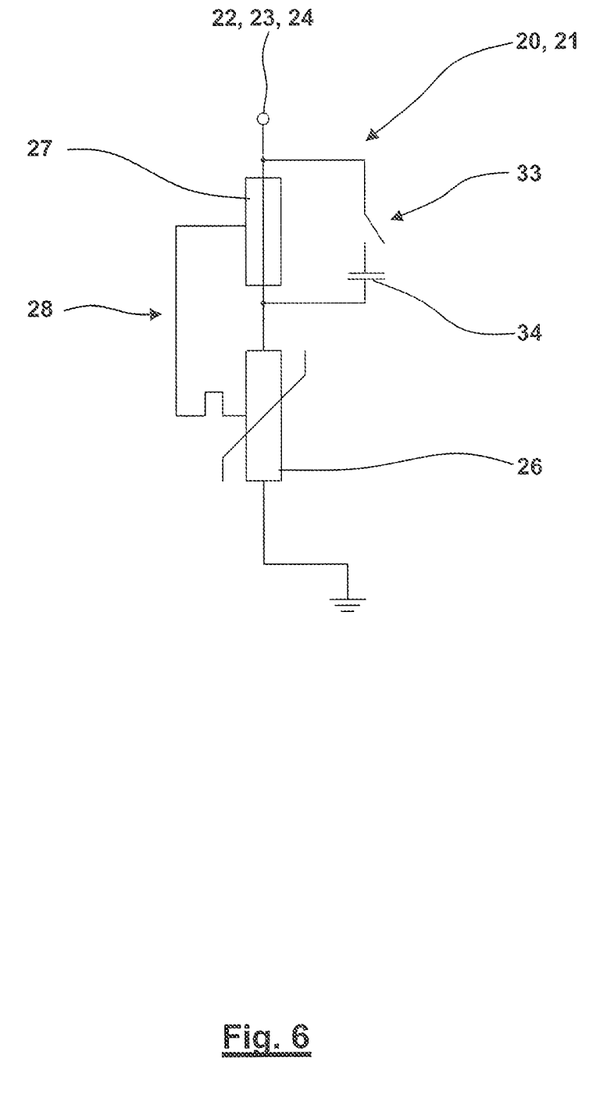
FIG. 6 is a schematic diagram illustrating a third embodiment of the electric arc extinction in one of the surge arrestors according to FIG. 2.

According to another embodiment illustrated in FIG. 6, the switch 33 is connected in series with an extinguishing capacitor 34 and the two elements are connected in parallel with the lead fuse 27. The extinguishing capacitor operates to limit the charge flowing through the switch 33, i.e., the short circuit current when the switch 33 closes to extinguish the electric arc.

The invention claimed is:

1. An overvoltage protection apparatus for an inverter configured to feed electric energy from a DC voltage source into an AC power grid, comprising:
   a DC voltage input stage comprising at least two current-carrying lines and an EMC filter that comprises interference suppressing capacitors and interference suppressing inductors; and
   surge arrestors configured to divert overvoltages with respect to ground, wherein each surge arrestor is connected between a respective current-carrying line and ground, and each surge arrestor is located downstream of the EMC filter from a point of view of the DC voltage source.

2. The overvoltage protection apparatus according to claim 1, further comprising a buffer capacitance connected between the current-carrying lines downstream of the surge arrestors from the point of view of the DC voltage source, and wherein the surge arrestors are connected only between the current-carrying lines and ground.

3. The overvoltage protection apparatus according to claim 1, further comprising further surge arrestors connected to the current-carrying lines or to the feed lines that are configured to couple to the DC voltage source upstream of the EMC filter, from the point of view of the DC voltage source.

4. The overvoltage protection apparatus according to claim 3, wherein the further surge arrestors are spatially remote from the DC voltage source or its parts at a location of the inverter.

5. The overvoltage protection apparatus according to claim 4, wherein the further surge arrestors are located within a housing of the inverter.

6. The overvoltage protection apparatus according to claim 3, wherein the further surge arrestors are effective between each current-carrying line or each feed line and ground, on the one hand, and between the current-carrying lines or between the feed lines, on the other hand.

7. The overvoltage protection apparatus according to claim 3, further comprising plug-in positions provided for the further surge arrestors, wherein an occupancy of which is monitored by switches of a monitoring device.

8. The overvoltage protection apparatus according to claim 7, wherein the further surge arrestors are configured to switch switches when a diverted overvoltage has caused a permanent change of the respective surge arrestor.

9. The overvoltage protection apparatus according to claim 8, wherein the further surge arrestors each comprise two parallel diversion paths, wherein a varistor is connected in the one diversion path and a self-extinguishing lead fuse is connected in the other diversion path, wherein a selector switch switches from the one diversion path to the other diversion path, and the associated selector switch is switched over when the varistor has been subjected to a predefined thermal load.

10. An overvoltage protection apparatus for an inverter configured to feed electric energy from a DC voltage source into an AC power grid, comprising:
    a DC voltage input stage comprising at least two current-carrying lines and an EMC filter that comprises interference suppressing capacitors and interference suppressing inductors; and
    surge arrestors configured to divert overvoltages with respect to ground, wherein the surge arrestors are connected to the current-carrying lines downstream of the EMC filter from a point of view of the DC voltage source,
    wherein at least one of the surge arrestors comprises:
       a series connection of a varistor and a lead fuse, wherein the lead fuse is thermally coupled to the varistor; and
       a monitoring device configured to monitor a voltage across the lead fuse.

11. The overvoltage protection apparatus according to claim 10, wherein the monitoring device is powered by a self-sustained energy supply.

12. The overvoltage protection apparatus according to claim 10, wherein the lead fuse is not self-extinguishing.

13. The overvoltage protection apparatus according to claim 10, wherein the monitoring device is configured to recognize an electric arc condition in the lead fuse by identifying a characteristic voltage drop associated therewith, and extinguish the electric arc in the lead fuse by a switch operation.

14. The overvoltage protection apparatus according to claim 13, wherein the monitoring device operates switches of the inverter for voltage extinction.

15. An inverter, comprising:
    a DC-to-AC converter configured to receive a DC voltage and convert the DC voltage to an AC voltage for delivery to an AC power grid; and
    a DC input stage upstream of the DC-to-AC converter and configured to receive a DC input voltage from a DC voltage source, and provide a filtered DC input voltage to the DC-to-AC converter as the DC voltage,
    wherein the DC input stage comprises:
       an EMC filter coupled to input lines configured to receive the DC input voltage, and filter the DC input voltage to a filtered DC input voltage; and
       an overvoltage protection circuit connected between a line that receives the DC input voltage and ground, and arranged downstream of the EMC filter between the EMC filter and the DC-to-AC converter, wherein the overvoltage protection circuit is configured to suppress overvoltages thereat.

16. The inverter of claim 15, further comprising another overvoltage protection circuit arranged upstream of the EMC filter between the EMC filter and terminals that are configured to couple to the DC voltage source, wherein the another overvoltage protection circuit upstream of the EMC filter operates as a primary overvoltage protection, and the overvoltage protection circuit downstream of the EMC filter operates as a secondary overvoltage protection.

17. The inverter of claim 16, wherein the another overvoltage protection circuit upstream of the EMC filter protects against overvoltages of lines associated with the terminals and ground, and overvoltages between the lines, while the overvoltage protection circuit downstream of the EMC filter protects against overvoltages only of the lines associated with the terminals and ground.

18. An inverter, comprising:
    a DC-to-AC converter configured to receive a DC voltage and convert the DC voltage to an AC voltage for delivery to an AC power grid; and
    a DC input stage upstream of the DC-to-AC converter and configured to receive a DC input voltage from a DC voltage source, and provide a filtered DC input voltage to the DC-to-AC converter as the DC voltage,
    wherein the DC input stage comprises:
       an EMC filter coupled to input lines configured to receive the DC input voltage, and filter the DC input voltage to a filtered DC input voltage; and an overvoltage protection circuit arranged downstream of the EMC filter between the EMC filter and the DC-to-AC converter, wherein the overvoltage protection circuit is configured to suppress overvoltages thereat, wherein the overvoltage protection circuit comprises:
- a lead fuse, and
- a varistor in series with and thermally coupled to the lead fuse,
- wherein the series combination of the lead fuse and the varistor is connected between one line configured to couple to one of the two terminals of the DC voltage source and ground, and
- a monitoring circuit configured to monitor a voltage across the lead fuse and determine whether an overvoltage condition exists, and further is configured to detect an electric arc condition from the monitored voltage.

19. The inverter of claim 18, wherein the overvoltage protection circuit comprises a switch in parallel with the lead fuse, wherein the monitoring circuit is further configured to close the switch upon detection of the electric arc condition.

20. The inverter of claim 19, further comprising an extinguishing capacitor connected in series with the switch, wherein the series combination of the switch and the extinguishing capacitor is in parallel with the lead fuse.

* * * * *